United States Patent [19]

Nehrbass

[11] Patent Number: 5,235,382
[45] Date of Patent: Aug. 10, 1993

[54] PHOTOCOPY MACHINE COVER

[76] Inventor: Seth M. Nehrbass, 619 Nashville Ave., Apt. C, New Orleans, La. 70115

[21] Appl. No.: 148,770

[22] Filed: Jan. 26, 1988

[51] Int. Cl.$^5$ ............................................ G03B 27/62
[52] U.S. Cl. ........................................ 355/75; 355/76
[58] Field of Search .................... 355/75, 76, 125, 126

[56] References Cited

U.S. PATENT DOCUMENTS

| | | | |
|---|---|---|---|
| 3,152,528 | 10/1964 | Pendry | 355/75 |
| 3,685,905 | 8/1972 | Marshall et al. | |
| 4,157,222 | 6/1979 | Ishihara. | |
| 4,172,660 | 10/1979 | Yanofsky et al. | |
| 4,386,847 | 6/1983 | Torto et al. | |
| 4,395,115 | 7/1983 | Tsuda et al. | |
| 4,575,215 | 3/1986 | Ariyama et al. | 355/75 |

Primary Examiner—Monroe H. Hayes
Attorney, Agent, or Firm—Pravel, Gambrell, Hewitt, Kimball & Krieger

[57] ABSTRACT

Apparatus for providing a background having a desired color and/or pattern on photocopies made of bulky objects comprises a cover for placement between a platen of a photocopy machine and a bulky object, such as a book, to be photocopied. In the preferred embodiment, the cover comprises a clear, transparent, flexible envelope filled with a white liquid. The cover is placed on a platen of a photocopy machine, and a book to be photocopied is placed face-down on the cover. The weight of the book, or pressure applied on the book, forces the white liquid out of the area between the pages of the book to be photocopied and the platen, allowing the photocopy machine to "see" the page or pages to be photocopied against a white background. A photocopy reproduces the page on a white background, instead of the black background which is usually present in a photocopy, made without the cover, of a page of a book.

6 Claims, 2 Drawing Sheets

PHOTOCOPY MACHINE COVER

BACKGROUND OF THE INVENTION

1. Field of the Invention

The present invention relates generally to photocopy machines, and more specifically to covers for photocopy machines.

2. General Background

Photocopy machines have been around for a long time. Relatively recently, they have become more economical and, hence, more common.

Most photocopy machines have covers which are hinged to the machine. An object is placed on the platen of the photocopy machine, the cover is closed, and a photocopy of the object is made. If the object is a piece of paper, for example, the cover closes completely, and if the piece of paper does not completely fill the area of the platen being photocopied, the cover pressed against the platen provides a white background for the photocopy. If, on the other hand, a bulky object such as a book is being photocopied, the cover cannot close completely, and if the book does not fill the area of the platen being photocopied, the photocopy has a black background. Aside from being unsightly, this black background is wasteful, as a lot of toner and developer is used to produce the black background.

There have been various proposals to facilitate copying of books. These proposals have primarily dealt with apparatus to assist holding books down flat on the platen while they are being copied. Some have also been concerned with limiting the amount of light radiating from a photocopy machine when a book is being copied.

U.S. Pat. No. 3,685,905, assigned to Xerox Corporation, discloses a light-tight cover for a photocopier. The cover is opened, the book is placed face-down on the platen, and the cover is closed. The cover, which is flexible, is then pressed down into contact with the book to insure that the book is flat on the platen, and the photocopy is made.

U.S. Pat. No. 4,157,222, assigned to Minolta Camera, discloses a cover which is flexible in two locations to allow the main portion of the cover to lie flat on the book. It is not light-tight.

U.S. Pat. No. 4,172,660, assigned to Pitney-Bowes, Inc., discloses a cover, for a photocopy machine, which is pivotally attached to a pair of linking arms which are themselves pivotally attached to the photocopy machine. This allows the cover to align parallel to the platen of the photocopy machine when copying books which, when open, have a thickness less than the length of the arms.

U.S. Pat. No. 4,386,847, assigned to Coulter Systems Corporation, discloses a similar cover.

U.S. Pat. No. 4,395,115, assigned to Olympus Optical Company Limited, discloses a conveyor unit for photocopy machines of the type where the platen moves laterally as the photocopy is made. The conveyor unit has a rectangular, transparent platen of relatively flexible material, such as thin plastic. The conveyor unit has means to press a book into engagement with the platen.

SUMMARY OF THE PRESENT INVENTION

The present invention comprises apparatus for providing a background having a desired color and/or pattern on photocopies made of bulky objects, such as books. The apparatus of the present invention preferably comprises a container having a clear, transparent, lower sheet, a flexible, clear, transparent, upper sheet, and a material in the container which produces an image having a desired color and/or pattern when photocopied.

In the preferred embodiment of the present invention, the apparatus comprises a flexible, clear, transparent envelope containing a white liquid. The cover is slightly larger than a platen of a photocopy machine. The cover is placed on the platen of the photocopy machine and a bulky object, such as a book, to be photocopied is placed on the cover. The weight of the book, or pressure applied thereon, forces the liquid out of the area between the pages of the book to be photocopied and the platen of the photocopy machine, allowing the photocopy machine to "see" the pages to be photocopied against a white background. A photocopy made using the cover of the preferred embodiment of the present invention has a white background where the page of the book does not fill the area being photocopied, as opposed to the black background which is present when making a photocopy without the cover of the present invention. Using the cover of the present invention produces a photocopy which saves the toner and developer necessary to produce the black background. Furthermore, the photocopy is more aesthetically pleasing and more useful, since notes can be made in the margins of the photocopy.

It is an object of the present invention to provide apparatus for providing a background of a desired color and/or pattern on photocopies made of bulky objects.

It is a further object of the present invention to provide apparatus for providing a white background on photocopies made of bulky objects, such as books.

Another object of the present invention is to provide a method for providing a background of a desired color and/or pattern on photocopies made of bulky objects.

BRIEF DESCRIPTION OF THE DRAWINGS

For a further understanding of the nature, objects, and advantages of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
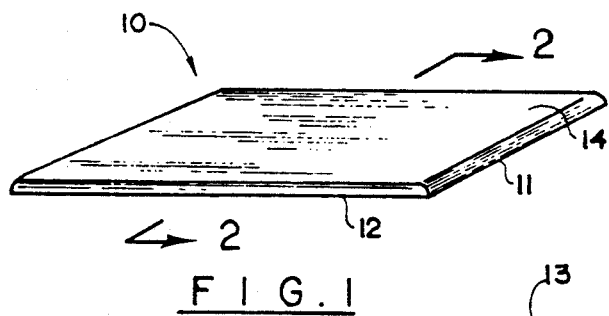
FIG. 1 is a perspective view of the preferred embodiment of the apparatus of the present invention.
Figure 2:
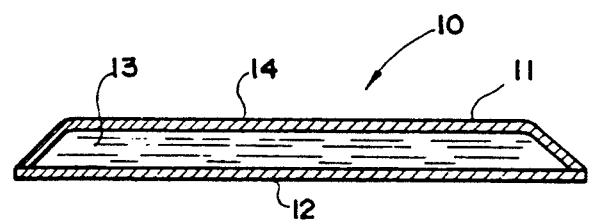
FIG. 2 is a cross-sectional view taken along the lines 2—2 in FIG. 1.

The apparatus of the present invention, photocopy machine cover 10, is shown in FIGS. 1-5. Cover 10 comprises a clear, transparent envelope 11 having a lower sheet 12 of clear, transparent material and an upper sheet 14 of flexible, clear, transparent material. Sheets 12 and 14 are joined at their edges in an airtight, fluid-tight manner. Envelope 11 is filled with a material 13 which produces a white image when photocopied. Material 13 may comprise, for example, an opaque liquid, such as white paint, an opaque solid, such as talcum powder, an opaque gas, or some other type of fluid material. Cover 10 preferably has an area, in plan, substantially equal to that of a platen of a photocopy machine (or substantially equal to the area of the region being photocopied), and more preferably, the plan area of cover 10 is greater than that of a platen of a photocopy machine on which it is to be used. The thickness of material 13 is sufficient for cover 10 to produce a white image when photocopied. It has been found that a thickness on the order of 1 mm is sufficient when white latex paint is used as material 13.

Figure 3:
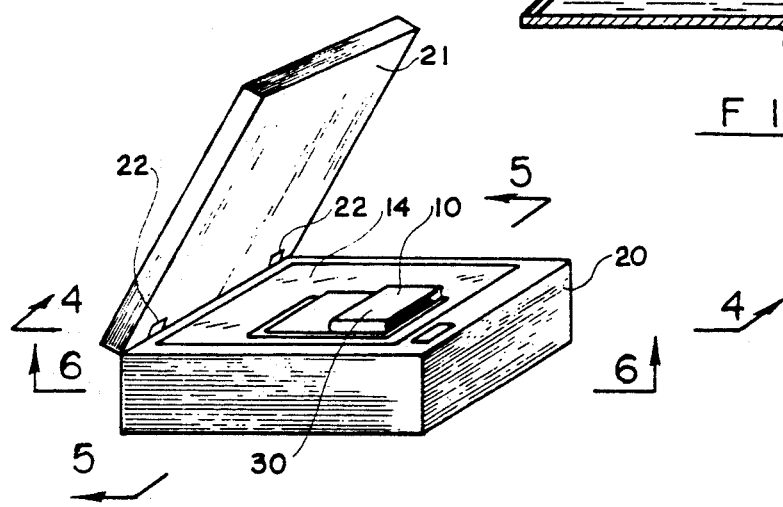
FIG. 3 is a perspective view of the apparatus of the present invention being used on a photocopy machine.
Figure 4:
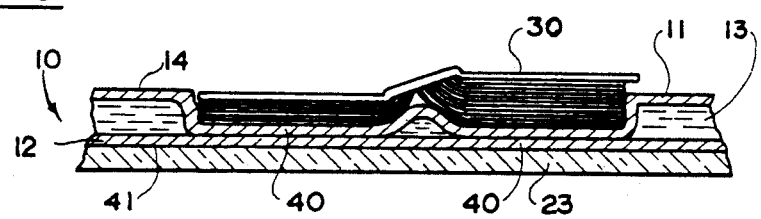
FIG. 4 is a cross-sectional view taken along lines 4—4 in FIG. 3.
Figure 5:
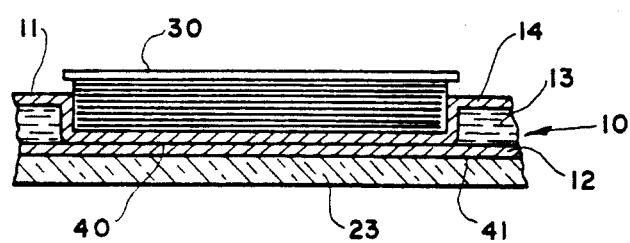
FIG. 5 is a cross-sectional view taken along lines 5—5 in FIG. 3.

In operation on a standard photocopy machine 20 (FIG. 3) having a standard cover 21 attached with hinges 22 to machine 20, cover 10 is placed on platen 23 (FIGS. 4 and 5). Cover 10 preferably has an area, in plan, substantially equal to the area in plan of platen 23, and more preferably has a greater area, such that when cover 10 is placed on photocopy machine 20, cover 10 completely covers platen 23.

Figure 6:
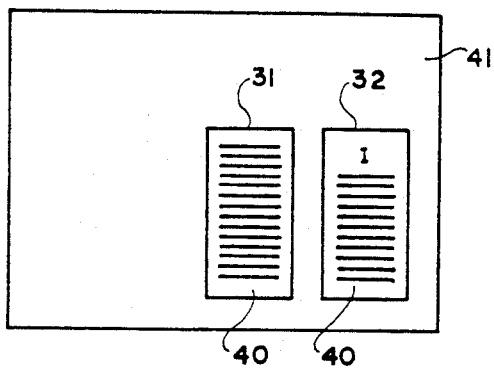
FIG. 6 is a view of what a photocopy machine "sees" when the apparatus of the preferred embodiment of the present invention is being used when making a photocopy of a book, taken along lines 6—6 in FIG. 3.

A bulky object to be photocopied, such as a book 30, is placed on cover 10. Book 30 is placed face-down on cover 10 (FIGS. 3-5). The weight of book 30 forces material 13 out of the area 40 between pages 31 and 32 (see FIGS. 4 and 5) and platen 23, allowing sheet 14 of flexible, clear, transparent material to come into contact with sheet 12 of clear, transparent material. FIG. 6 is a view of what photocopy machine 20 "sees" at this point. Photocopy machine 20 has a clear view of pages 31 and 32, with material 13 providing a background in the area 41 not occupied by pages 31 and 32. A photocopy 50 (FIG. 8) is then made, providing a reproduction 52 of page 32 against a white background 51.

Figure 7:
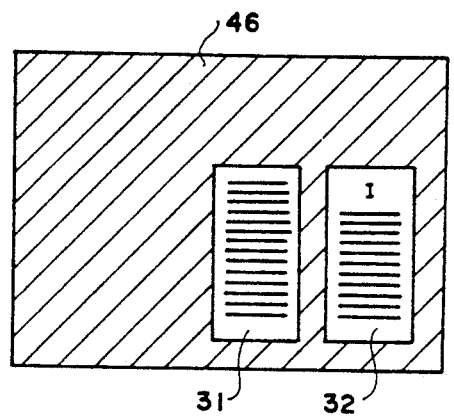
FIG. 7 is a view, similar to the view in FIG. 6, of what a photocopy machine "sees" when a photocopy of a book is made without the apparatus of the present invention.

A view of what photocopy machine 20 "sees" when cover 10 is not used is shown in FIG. 7. Photocopy machine 20 "sees" pages 31 and 32 against a black background 46. When a photocopy 55 (FIG. 9) is made, a reproduction 52 of page 32 against a black background 56 is provided.

Figure 8:
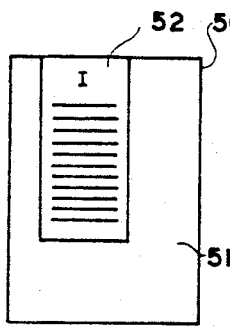
FIG. 8 shows a photocopy of a page of a book made with the apparatus of the preferred embodiment of the present invention.
Figure 9:
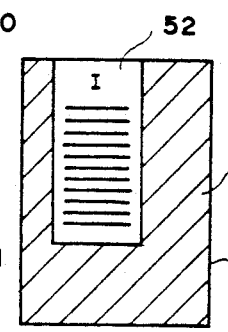
FIG. 9 shows a photocopy of a page of a book made without the apparatus of the present invention.

As can be seen by comparing photocopy 50 shown in FIG. 8 with photocopy 55 shown in FIG. 9, photocopy 50 made with cover 10 of the present invention has an aesthetically pleasing white background 51, as opposed to the black background 56 in photocopy 55.

Using cover 10 when making photocopies produces a photocopy 50 which is not only more aesthetically pleasing, due to white background 51, but is also more functional, since notes may be made in the white background 51, and more economical, since the extra toner and developer needed to make black background 56 is saved. In places where numerous photocopies of books are made, such as in law libraries, the savings of toner and developer made possible by the use of cover 10 can be substantial.

As shown in the above example, cover 10 is pressure-sensitive, allowing light to be transmitted therethrough where pressure is placed upon it (area 40 in FIGS. 4 and 5) and reflecting light where pressure is not placed upon it (area 41 in FIGS. 4 and 5). While cover 10 is shown in the above example as a clear, transparent envelope 11 having a material 13 therein which produces a white image when photocopied, the present invention may comprise any pressure-sensitive device or material which allows light to be transmitted therethrough where pressure is placed upon it, and which reflects light where pressure is not placed upon it.

Photocopy machine cover 10 could, as was mentioned before, be made slightly larger than platen 23. Cover 10, for example, could extend beyond the extent of platen 23 so that, when cover 21 is closed over, for example, a sheet of paper, material 13 could exit the area between cover 21 and platen 23, and cover 10 would bulge in the area that extends beyond standard cover 21. In this manner, upper sheet 14 would contact lower sheet 12 in the area between standard cover 21 and platen 23. When cover 10 is larger than platen 23, cover 10 could be used, for example, where the user of photocopy machine 20 alternates frequently between photocopying books and sheets of paper, and would not like to have to remove cover 10 each time he switches from copying books to copying single sheets of paper.

While material 13 has been described as a material which produces a white image when photocopied, material 13 need not necessarily be white. Some photocopy machines interpret certain colors and shades of colors as white, and material 13 could comprise a material of such colors or shades of colors. Material 13 is preferably white, however, to be compatible with all photocopy machines, including color photocopy machines.

It may be desirable to produce, rather than a white background, a background of a desired shade of gray when using a black and white photocopy machine, or of a desired color when using a color photocopy machine. In such a case, envelope 11 may contain any material which produces the desired color when photocopied.

Sheets 12 and 14 may comprise, for example, a plastic material such as that used to make sandwich or storage bags, or a clear, transparent synthetic rubber.

Figure 10:
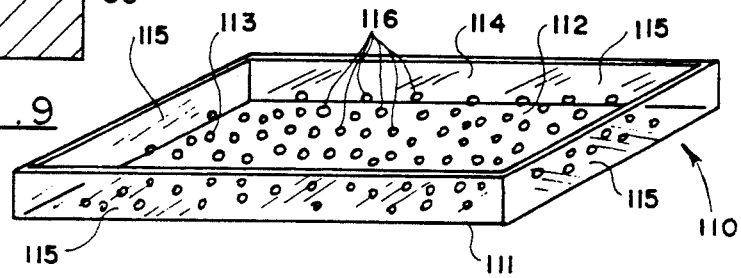
FIG. 10 is a perspective view of a second embodiment of the present invention.

A second embodiment of the present invention, photocopy machine cover 110, is shown in FIG. 10. Photocopy machine cover 110 comprises a box 111 having a cover sheet 112 of a clear, transparent material, an upper sheet 114 of a flexible, clear, transparent material, and side walls 115. Side walls 115 may, but need not be, transparent, and are preferably rigid. Box 111 has a material 113 therein. Material 113 preferably produces a white image when photocopied, but may produce images of other desired colors. Material 113 may comprise a solid, liquid, or gas. In FIG. 10, material 113 comprises small white spheres 116. Spheres 116 produce a light gray and white pattern when photocopied. Box 111 could also contain a clear, transparent liquid, such as water, when spheres 116 are made of polystyrene plastic, such as the plastic sold under the trademark Styrofoam, such that spheres 116 float out of the way of a book (not shown) when it is placed on cover 110, thereby allowing upper sheet 114 to come into contact with lower sheet 112, such that a clear image of the page of the book being photocopied can be made. If necessary, box 111 can be tilted when a book is placed on it, so that spheres 116 roll to one side of box 111, allowing upper sheet 114 to come into contact with lower sheet 112. When box 111 is lowered, spheres 116 surround the book, providing a background of a desired color and pattern when a photocopy is made.

Figure 11:
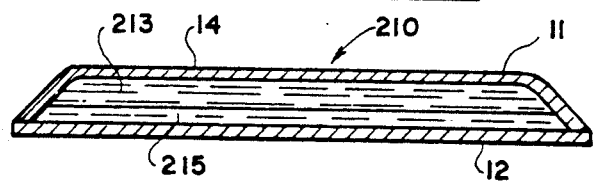
FIG. 11 is a cross-sectional view of a third embodiment of the present invention.
Figure 12:
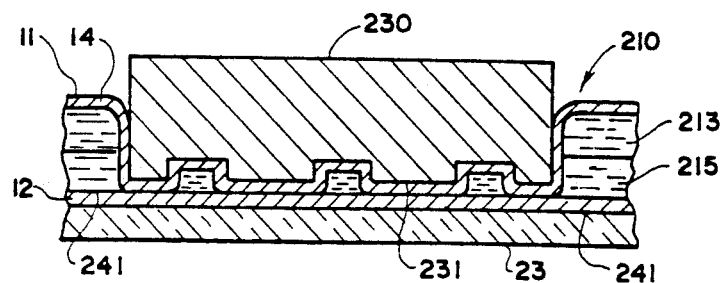
FIG. 12 is a cross-sectional view of the apparatus shown in FIG. 11 being used to make a photocopy of a bulky object.

A third embodiment of the present invention, photocopy machine cover 210, is shown in FIGS. 11 and 12. Photocopy machine cover 210 differs from photocopy machine cover 10 in that there are two types of material, upper material 213 and lower material 215, in envelope 11. Lower material 215 is immiscible with upper layer 215 and has a density greater than that of upper material 213. Upper material 213 and lower material 215 produce an image having a desired color and/or pattern when photocopied. Lower material 215 is preferably clear and transparent, and upper material 213 is preferable opaque. Lower material 215 may comprise, for example, water and upper material 213 may comprise, for example, white oil or white spheres of polystyrene plastic. Cover 210 is useful, for example, when photocopying a bulky object such as an object 230 (shown in FIG. 12) having an irregular bottom surface 231.

In operation, cover 210 is placed on platen 23 and object 230 is placed on cover 210. As seen in FIG. 12, only sheets 12 and 14 and material 215 are disposed between bottom surface 231 of object 230 and platen 23, while in the area 241 not occupied by the bottom surface 231 of object 230, upper material 213 is present, producing a background of a desired color and/or pattern when photocopied. Cover 210 thus allows irregular surfaces to be photocopied, while providing a background of a desired color and/or pattern on the photocopy.

While only a few preferred embodiments of the present invention have been illustrated and described herein, there are numerous changes which can be made thereto without departing from the spirit or scope of the present invention. I therefore pray that my rights to the present invention be limited only by the following claims.

I claim:

1. Apparatus for providing a background of a desired color on photocopies made of bulky articles, the apparatus comprising:
 a cover for placement between a platen of a photocopy machine and an article to be photocopied; and
 means for allowing light to be transmitted through the cover where pressure is placed upon the cover and for causing light to be reflected from the cover where pressure is not placed upon the cover, wherein:
 the cover comprises a clear, transparent envelope containing a material which produces an image having the desired color when photocopied, and
 the envelope comprises:
 a lower sheet of clear, transparent material; and
 an upper sheet of clear, transparent, flexible material.

2. Apparatus for providing a background of a desired color on photocopies made of bulky articles, the apparatus comprising:
 a cover for placement between a platen of a photocopy machine and an article to be photocopied; and
 means for allowing light to be transmitted through the cover where pressure is placed upon the cover and for causing light to be reflected from the cover where pressure is not placed upon the cover, wherein:
 the cover comprises a clear, transparent envelope containing a material which produces an image having the desired color when photocopied, and
 the cover further comprises a clear, transparent liquid which is immiscible with the material.

3. The apparatus of claim 2, wherein:
 the clear, transparent liquid has a density greater than that of the material.

4. The apparatus of claim 3, wherein:
 the material comprises an opaque liquid.

5. Apparatus for providing a white background on photocopies made of bulky articles, the apparatus comprising a cover for placement between a platen of a photocopy machine and an article to be photocopied, the cover comprising:
 an envelope comprising:
 a lower sheet of clear, transparent material; and
 an upper sheet of clear, transparent, flexible material; and
 a fluid material, in the envelope, which produces a white image when photocopied.

6. A method of providing a background of a desired color on photocopies made of bulky articles, the method comprising the steps of:
 (a) placing a cover on a platen of a photocopy machine, the cover being pressure-sensitive, allowing light to be transmitted therethrough where pressure is placed upon it, and reflecting lgiht where pressure is not placed upon it;
 (b) placing an article to be photocopied on the cover; and
 (c) making a photocopy of the article, wherein:
 (d) the cover comprises a clear, transparent envelope containing a material which produces a white image when photocopied, and
 the cover further comprises a clear, transparent liquid which is immiscible with the material.

* * * * *